(12) United States Patent
McNelly

(10) Patent No.: US 6,524,848 B2
(45) Date of Patent: Feb. 25, 2003

(54) RECIRCULATING COMPOSTING SYSTEM

(76) Inventor: James J. McNelly, 1034 Bromo Ave. N., St. Cloud, MN (US) 56303

( * ) Notice: Subject to any disclaimer, the term of this patent is extended or adjusted under 35 U.S.C. 154(b) by 0 days.

(21) Appl. No.: 09/960,830

(22) Filed: Sep. 22, 2001

(65) Prior Publication Data

US 2002/0108414 A1 Aug. 15, 2002

Related U.S. Application Data

(60) Provisional application No. 60/234,962, filed on Sep. 23, 2000.

(51) Int. Cl.$^7$ ............................ C12M 1/00; C05F 11/08
(52) U.S. Cl. ............................ 435/290.1; 435/286.6; 71/9; 71/11
(58) Field of Search ............................ 435/286.6, 290.1, 435/290.2, 290.3, 290.4; 71/9, 11

(56) References Cited

U.S. PATENT DOCUMENTS

| | | | |
|---|---|---|---|
| 4,956,002 A | * 9/1990 | Egarian | 435/290.1 |
| 5,175,106 A | * 12/1992 | Laurenson, Jr. | 435/243 |
| 5,206,173 A | * 4/1993 | Finn | 435/290.1 |
| 5,459,071 A | * 10/1995 | Finn | 366/345 |
| 5,597,732 A | * 1/1997 | Bryan-Brown | 435/290.1 |

\* cited by examiner

*Primary Examiner*—David A. Redding
(74) *Attorney, Agent, or Firm*—Albert W. Watkins

(57) ABSTRACT

A recirculating composting apparatus cycles air and waste gases through a composting vessel, into a curing bin which contains previously composted material. Within the curing bin, ammonia and other noxious gases are adsorbed and converted into valuable fertilizer. The gases released from the curing bin may pass into another curing bin and then be recirculated back into the composting vessel, or may alternatively be released into the environment or passed through a biofilter. In preferred embodiments, like containers may be used for each curing phase and also the composting phase. The use of similar or compatible containers allows an entire vessel to be converted from a composting vessel into a curing bin simply by disconnection at one location and reconnection at a different location, without having to disturb the contents within the vessel or incur the undesired associated labor. Furthermore, resulting fertilizer products may be enriched with nutrients, have pH controlled, or be controlled to optimize various elements, gases, or heat during the curing phase, thereby simultaneously preventing a loss of nutrients and simultaneously increasing the economic value of the finished fertilizer.

10 Claims, 2 Drawing Sheets

RECIRCULATING COMPOSTING SYSTEM

This application claims the benefit of Provisional Application No. 60/234,962, filed Sep. 23, 2000.

BACKGROUND OF THE INVENTION

1. Field of the Invention

The present invention pertains generally to a composting system for biologically converting diverse and potentially hazardous source materials into safe and agriculturally beneficial soil amendments and fertilizers. More particularly, the invention comprises an array of enclosed containers which perform the various steps of composting, curing and biofiltration, and which provide only limited, controlled exchange of gases and liquids into the environment during the biological conversion process. In an even more specific embodiment, the source materials are first composted, then cured, and finally serve as biofiltration media in a closed-loop system. Gases are recirculated from compost through curing and biofiltration and back into the compost, while temperature and gas content within the closed loop are carefully regulated.

2. Description of the Related Art

Before about 1970, composting was typically a simple process in which waste materials were piled and allowed to sit until they decomposed. It was most frequently done on a small scale and was not often considered for industrial-scale problems. The ingredients placed into these piles were poorly controlled, and the resulting mixture would decompose unpredictably, frequently anaerobically, with strong odors associated therewith. Unfortunately, often the strength of these odors were in direct correlation to the loss of valuable fertilizer components such as nitrogen. Vermin were also often attracted to these piles, creating hazardous vectors for transmission of disease.

An advance in composting technology came from the realization that adding air to the composting mixture could increase the efficiency of composting. The microbes that produce more desirable fertilizer require air, and will smother inside of a static unaerated pile. Hence, the initial methods of aeration involved moving or agitating the compost to allow air into the stack. This method only partially satisfies the need for aeration, and consequently only poorly addresses odors and nutrient loss, and does nothing to limit access by vermin. composting mixture could increase the efficiency of composting. The microbes that produce more desirable fertilizer require air, and will smother inside of a static unaerated pile. Hence, the initial methods of aeration involved moving or agitating the compost to allow air into the stack. This method only partially satisfies the need for aeration, and consequently only poorly addresses odors and nutrient loss, and does nothing to limit access by vermin.

A typical example of this aeration is a windrow turner that picks up the compost and dumps it to one side. Most municipal composting sites are currently windrow turner operations, though process control is, unfortunately, quite primitive. Piles are typically turned at the convenience of the operator, rather than to optimize the composting process. A typical pile of compost will use all of its oxygen within about one-half hour, so such windrow turning is seldom related to actual oxygen demand. Turning is done seldom enough that microbes in the center of the pile are rapidly depleted, and the center of the pile stops composting. Turning the pile merely re-inoculates the center material with fresh microbes, and composting continues in the center of the pile for another one-half hour when the oxygen supply is, once again, depleted. Unfortunately, the repeated mechanical actions that are required for turning destroy some beneficial fungi that rely on large, filamentous growth. In addition to the oxygen and mechanical problems introduced by a windrow system, composting with windrow turners is typically done in an open, unsheltered area. The vagaries of weather and rainfall most often determine the water content of the composting mass. When there is too little rain, the pile is too dry. When there is too much rain, the pile is wet and requires frequent turning. Too much rain can also lead to problems with runoff of leachate. During the loss of leachate there will not only be a loss of fertilizer value but also a potential hazardous contamination of surrounding surface water and soil. In the open, of course, it is also very difficult to control access by vermin.

One method used to overcome some of the disadvantages of pile composting is to enclose compost piles in a building. An enclosure that keeps rain off of the compost allows better regulation of water content. However, such a facility is very expensive. Furthermore, with pile composting, various irritating and potentially toxic gases are sometimes produced. Since operators must enter the enclosure to maintain the composting process, enclosing compost also involves maintaining the quality of large volumes of air within the building. Without high-quality and high-quantity air handling systems, the atmosphere within an enclosure can be irritating, if not toxic, to an operator. Sadly, with the removal of air in the building is a removal of nutrients from the compost. Consequently, the resulting compost is little better in fertilizer value than the compost of the open windows and piles. These enclosed buildings do, however, help to control or prevent access to the compost by most vermin.

Some of the disadvantages of pile composting are overcome by more modern reactor vessel processes. By design, the reactor vessel is typically only slightly larger than the compost which it contains. This reduces the land area required to store the compost during the composting process. In addition to reduced land area, the total volume containing or enclosing the compost is also reduced. Lower total volume means reduced air handling requirements. Furthermore, in-vessel reactors also provide the opportunity for collection of potentially odorous emissions. The compost is enclosed, and exhaust air may be routed through a filtration system. This separation of operator from compost air benefits the health and safety of all operators. There are other benefits, beyond land space and air handling, from reactor vessels. Handling and mixing, which is required in all systems, can also be mechanized using reactor vessels, and the compost is enclosed.

Unfortunately, vessel systems to date are complicated systems which require precision construction techniques and permanent, stable foundations. This necessarily drives the cost of present reactor vessels systems to levels even higher than required for building-type enclosures. In exemplary prior art systems, organic waste is fed into an opening at one end of the reactor and compost is removed from the other end. The material is moved through the reactor by, for example, a complex moving floor apparatus or hydraulic ram. Aeration is sometimes provided by pressurized air forced through the organic waste from air vents located throughout the moving apparatus.

Some in-vessel systems also include mixing systems, typically rotating paddles or prongs, within the compost mass. Other in-vessel systems are static. The agitation systems used with in-vessel systems are expensive, prone to wear and failure, and provide agitation at intervals that are not readily controlled with respect to the progress of the composting process.

Even in the advanced in-vessel systems, there is still a limitation of the composting systems that must be addressed for wider acceptance in the marketplace. During the composting process, even in highly controlled in-vessel systems, there will always be a potential for generation of significant quantities of undesirable and odorous gases such as ammonia. Some artisans have reduced the levels of emissions of these gases through very careful measuring and control of the source materials which are undergoing biological transformation, but this control adds expense and undesirably limits the application of the composting system to only a very few applications. Other artisans have attempted to filter out of the gas stream the undesired contaminant gases. Various gas filtration devices have been proposed and implemented, including chemical scrubbers and biofilters. Chemical scrubbers tend to be quite expensive to operate, but more importantly produce new wastes that must be disposed of. This generation of secondary wastes tends to be very counterproductive. Furthermore, the waste removed in the form of contaminated gas or chemical scrubbers and filters represents a permanent loss of valuable soil nutrients.

Biofilters have more recently gained acceptance in treating odors from a diverse range of sources. These biofilters contain any of a fairly wide variety of substrate materials which support living organisms in an aqueous phase upon the surface of the substrate. These organisms feed upon the contaminants in the gas stream, and digest these contaminants into more basic and harmless components, such as carbon dioxide and water. While the substrate materials will only infrequently need replaced, they also may be used directly as an agricultural amendment of value and benefit. Consequently, a biofilter does not produce a second waste stream, but instead produces beneficial product for use in agriculture.

While biofiltration has enabled a compost facility to eliminate any secondary solid waste production, there has heretofore been very little control or regulation over the release of gases into the atmosphere. During rapid composting, it is possible to overload a biofilter with excessive levels of ammonia. Additionally, when source materials are introduced into the compost that are higher in nitrogen content than expected or for which the biofilter was designed, there will similarly be a surge in ammonia production. This surge can, on occasion, saturate the biofilter and lead to a release of undesirable levels of ammonia or other compounds into the environment. This not only presents an odor control problem, but also represents a loss of valuable nitrogen which would otherwise be most desirable for fertilizers used commonly with agricultural application. There is, therefore, a need to provide better control over the gases released from a compost system, while simultaneously allowing the compost system to handle a wider variety of source materials with less operator intervention.

SUMMARY OF THE INVENTION

In a first manifestation, the invention is a recirculating compost system having a closed aerobic compost vessel with a gas inlet and a gas outlet, a closed aerobic curing bin having a gas inlet and a gas outlet, and a closed biofilter having a gas inlet and a gas outlet. A gas stream is recirculated from the compost vessel through the biofilter to the curing bin and returned to the compost vessel. Ports are provided to introduce fresh air into the recirculation to replenish consumed oxygen, and to vent waste gas from the system. Additional biofiltration and monitoring are also available for further monitoring and control over the waste gas.

In a second manifestation, the invention is a method for biologically processing source materials into an agriculturally beneficial fertilizer. The steps include the recirculation of air and waste gases through a compost vessel, a biofilter and a curing bin. Various characteristics and composition of the gases are monitored and the system controlled in accordance therewith. The source material is cycled through the system from a compost vessel to a curing bin and finally to the biofilter. Additional controls and measurements are contemplated herein which enable the production of a fertilizer of consistent composition.

OBJECTS OF THE INVENTION

A first object of the present invention is to reduce the undesired loss of valuable soil nutrients from a composting system, and to consequently yield a higher value fertilizer than was heretofore possible. A second object of the invention is to enable precise measurement and control over the amount of contaminants released into the environment. A third object of the invention is to lower the cost of operation of a composting system, to make the system more economically attractive in the marketplace. Another object of the invention is to make a compost system more tolerant of variations in source material. A further object of the invention is to reduce the amount of operator intervention required to operate a compost system. Yet another object of the invention is to limit the type of intervention required, so that less technical training is required for an operator to successfully operate a compost system. These and other objects of the invention are achieved in the preferred embodiment, which will be best understood when considered in conjunction with the appended drawing figures.

DESCRIPTION OF THE PREFERRED EMBODIMENT

A preferred recirculating compost system will include a compost vessel Co, a first curing bin Cu1, and a second curing bin Cu2. The exact structure or construction of compost vessel Co, curing bin Cu1 and curing bin Cu2 are not critical to the operation of the invention. One suitable physical construction for these bins is illustrated in my published international application WO 00/26337 published May 11, 2000, though there are many other vessels known in the art which will perform satisfactorily in accord with the present teachings.

Compost vessel Co is filled with a source material as is known in the art, and the biological processes that produce compost are initiated. Most preferably, in terms of both cost of operation and quality of finished product, the composting will occur at a temperature of approximately 140 degrees Fahrenheit. Air is introduced into compost vessel Co and serves a source of oxygen, which is vital for aerobic digestion of the source material. During the composting process, a number of waste gases are produced that may include ammonia, though the present disclosure is understood to not be solely limited to these or any other set or combination of waste gases.

The gases which are exhausted from compost vessel Co are passed through a heat exchanger, where the gas will be cooled from the approximately 140 degrees Fahrenheit to approximately 70–108 degrees Fahrenheit. Some moisture will condense in the heat exchanger, and this moisture may be collected for further use in the system or may be released in the environment, depending upon the system and goals of the designer.

After leaving the heat exchanger, the gas is then passed into curing bin Cu2. Curing bin Cu2 will most preferably contain cured compost. Curing bin Cu2 then serves as a biofiltration device, extracting ammonia and other contaminants from the gas stream and biologically transforming these contaminants into harmless carbon dioxide, water, plant nutrients and other biologically compatible compounds. It is noteworthy here that curing bin Cu2 is not only continuing the usual curing process known in the art, but is also simultaneously being directly enriched in fertilizer value by the ammonia which is being extracted from the gas stream.

Figure 1:
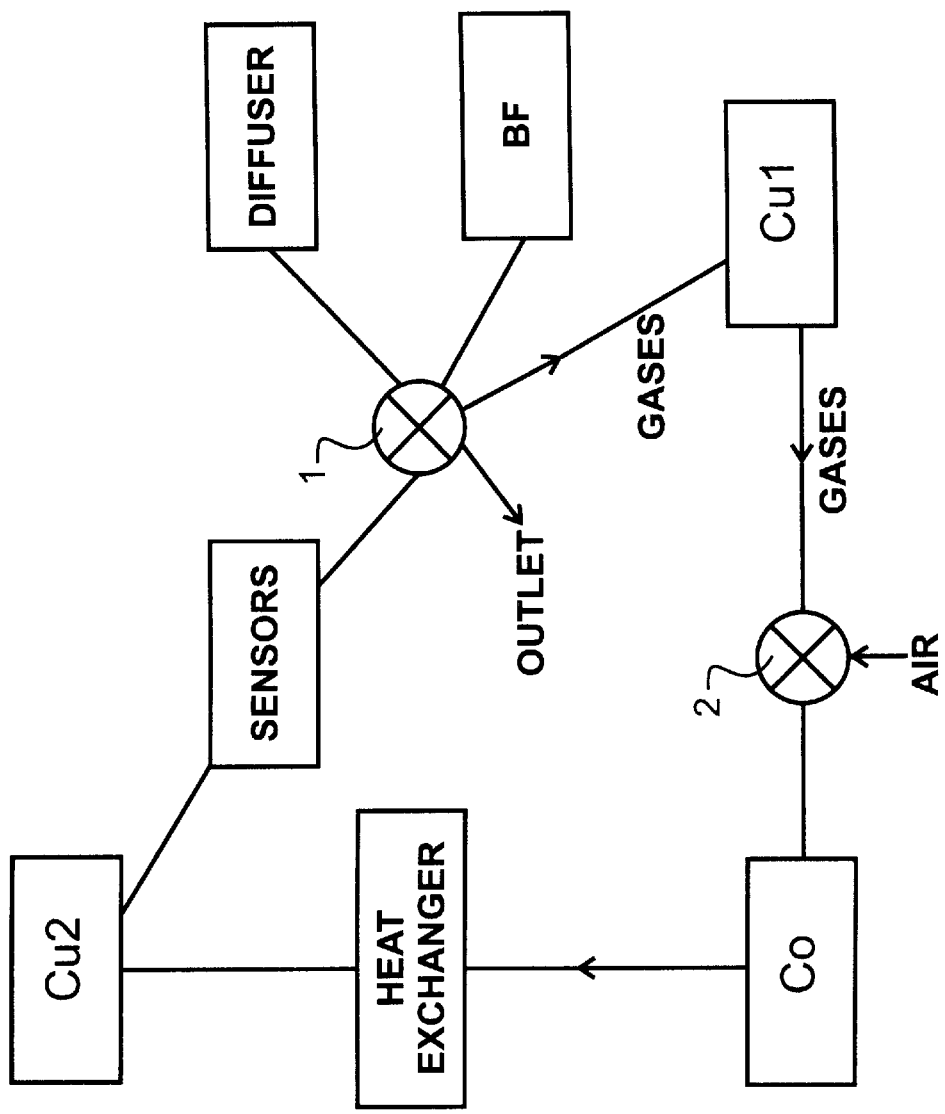
FIG. 1 illustrates the preferred embodiment compost system schematically, constructed in accord with the teachings of the present invention.

After leaving curing bin Cu2, the gases are quite similar to any ordinary air stream. The moisture and carbon dioxide levels will of course be elevated, but otherwise during normal operation this gas stream will be quite compatible with ambient air. In many ways, including elevated moisture and carbon dioxide, this air stream will closely resemble the air which a person breathes out. These components are, after all, produced using naturally occurring organisms. At this juncture then, it is quite possible to directly vent the gas stream to the atmosphere. This will be accomplished by passing the gas stream through valve 1 to the outlet, where it may be mixed directly with ambient air. It is conceivable that there may be occasion or source materials which place an extraordinary load upon curing bin Cu2, or where any release of contaminants is undesirable, even when curing bin Cu2 fails to adequately filter the gas stream or when curing bin Cu2 is removed for servicing. In these cases, it may be desired to add a second biofilter BF to the output, and switch valve 1 to pass the output stream through biofilter BF before releases to the ambient. In other instances, it may be desirable to diffuse the waste gas into the ambient, which will reduce problems such as condensation or frost accumulation in colder climates, for example. In such cases, which will readily be determined by those skilled in the art, a diffuser may be provided as illustrated in FIG. 1 and connected selectively through valve 1. As will be apparent, the exact configuration of the output from the preferred compost system is not critical, and may be adapted to a number of different possible configurations. Even valve 1 may be removed, and the output passed directly through either diffuser or biofilter BF, or released directly to the environment.

In practice, most of the gas from curing bin Cu2 will be recirculated to curing bin Cu1. Curing bin Cu1 is most preferably filled with composted material such as maybe taken from compost vessel Co after completion of a compost cycle. Most preferably, this material will have passed through the substantial part of the exothermic stage of composting, and would otherwise have been ready for storage in a typical prior art curing bin or curing pile. The gas circulation through curing bin Cu1 provides an adequate supply of oxygen thereto, ensuring continued development of a favorable product from the present composting system. In addition, in the event of a short-term overload of curing bin Cu2 caused by excess production of ammonia or the like from compost vessel Co, there will still be adsorption and conversion of the ammonia in curing bin Cu1, and the resultant enrichment thereof. In these instances, not only will curing bin Cu2 be directly enriched as a fertilizer, but so will curing bin Cu1.

After passing through curing bin Cu1, the gas stream will be recirculated into compost vessel Co. During the recirculation of the gas stream, many biological processes are occurring which consume oxygen. At some point, preferably before the oxygen levels are depleted below 15 percent, and most preferably before the levels drop below 10 percent, additional oxygen should be introduced into the gas stream. While this may be in the form of pure oxygen, thereby minimizing the amount of gas which must also be removed from the system, the handling of pure oxygen in a composting facility is considered to be quite dangerous and adds unnecessary cost to the system. Consequently, air taken from the ambient environment will normally serve as the source for additional oxygen. FIG. 1 illustrates this air inlet at valve 2. However, one or more inlets may be provided throughout the system. For example, introduction of ambient air into the gas stream between compost vessel Co and curing bin Cu2 will serve to lower the temperature and relative humidity of the gas stream, thereby lowering the load upon the heat exchanger.

Sensors will also most preferably be provided in the system, and at least some of these will most desirably be provided in the gas stream coming from the output of curing bin Cu2. These sensors can monitor the concentration of various contaminants and also the gas flow rate. In the event the gas is vented to ambient, it is possible to monitor and track, continuously if desired, the concentrations of contaminants emitted and also the total mass over a given time interval. These sensors can be used in conjunction with an electronic control system to only release through a particular output device when the contaminants are within a particular range. For example, should the compost within compost vessel Co have an unusually high ammonia emission that overloads the biofiltration function of curing bin Cu2, then valve 1 can be controlled to prevent the release of any gas into the ambient environment, and instead recirculate the entire gas stream. Should this situation not be resolved, and there be a need for additional oxygen, valve 1 can be controlled to pass the gas stream through biofilter BF prior to release, thereby preventing unwanted emissions into the ambient.

Sensors or intermittent testing may also be used to determine one or more of the particular nutrient values of a compost within curing bin Cu2. In one embodiment, the contents of curing bin Cu2 may be maintained therein and exposed to high nitrogen (ammonia or the like) gas streams from compost vessel Co to enrich the compost. At some time, the contents of curing bin Cu2 will reach a nitrogen level high enough to be of significantly more value as a fertilizer than the original compost. When this target value is achieved, the contents of curing bin Cu2 may next be removed and prepared for sale or placement as valuable fertilizer. Similarly, it is conceivable to control the pH of the compost or fertilizer, for example, for the tailoring of compost to a specific or optimum plant growth requirement. In addition, various testing and control is contemplated herein to enable an operator to explicitly extract carbon dioxide, heat or other by-product produced in the process that may be useful. It is noteworthy here that carbon dioxide is also a plant nutrient, and heat can be a valuable resource, particularly in the colder climates. Consequently, the present recirculation system enables the custom production of particular fertilizer or compost blends, and reproducibility within subsequent batches.

Figure 2:
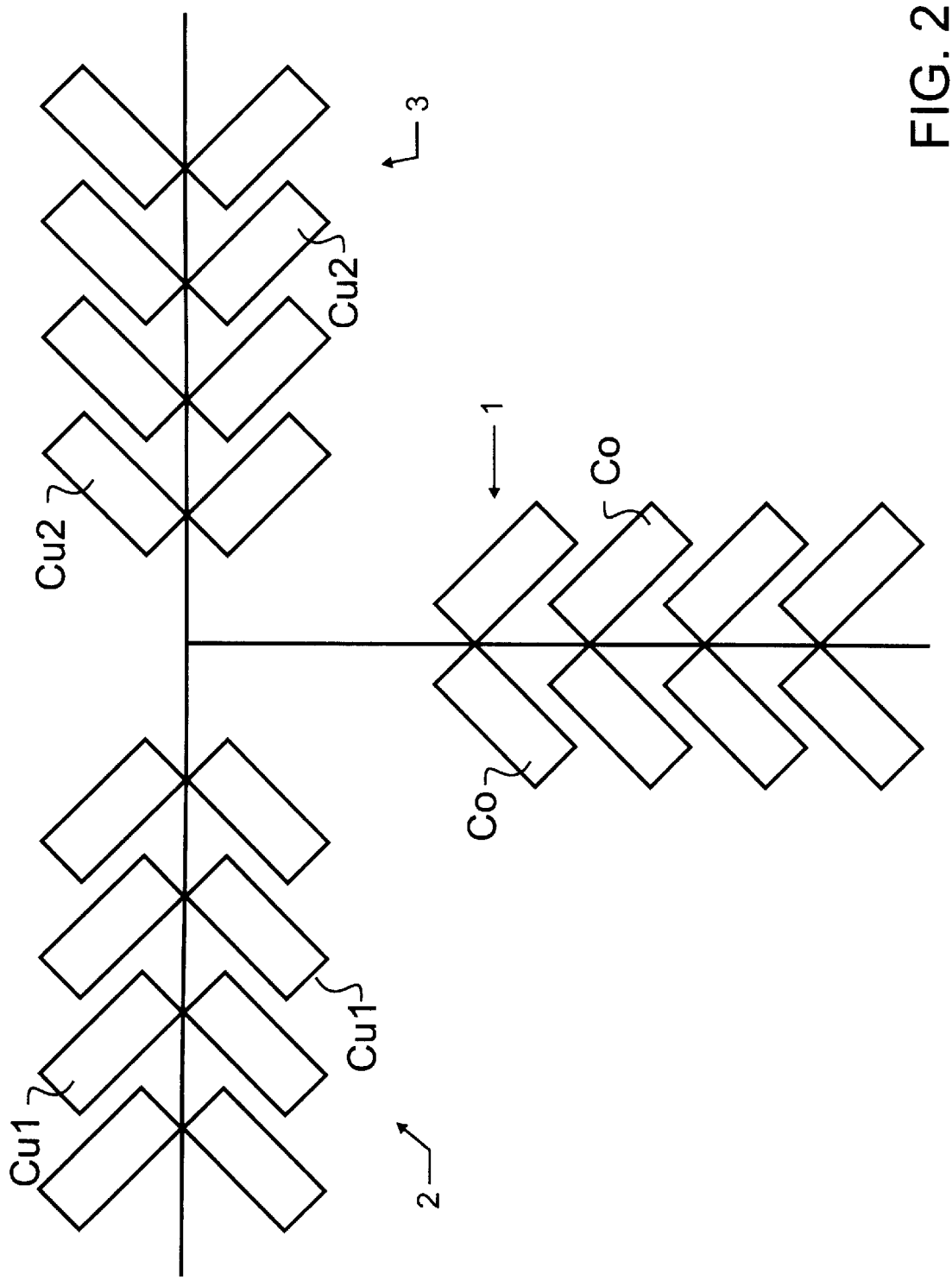
FIG. 2 illustrates the preferred embodiment compost system of FIG. 1 diagrammatically from a top plan view.

FIG. 2 illustrates from a top plan view one possible arrangement that is preferred. In this configuration, a plurality of composting vessels may be arranged along a row as shown at 1. These bins are connected to a common air conduit which provides both incoming and outgoing flow of the gas stream to each composting vessel. When a single composting vessel has finished a composting cycle, which in the preferred embodiment may be a fifteen-day cycle, then the composting vessel may be disconnected from the common air conduits. The vessel may be dumped for remixing, or may alternatively be transported for connection to the initial curing section as a curing bin $Cu1$. This curing process will typically take approximately thirty days. This curing stage provides only limited energy release and limited moisture production. However, aeration of the curing bin is beneficial, and in most instances, the introduction of additional warmth and moisture prior to passing the gas stream into the composting vessels Co is desirable.

Once the material within a curing bin $Cu1$ is adequately cured, the bin may once again be disconnected and transported to the secondary curing location designated by bins $Cu2$. This secondary curing will typically require an additional approximately 30 days. The secondary curing bins $Cu2$ serve the additional function of biofiltration, receiving the gases from compost vessels Co. In the most preferred embodiment illustrated in FIG. 1, the biofiltered output from curing bins $Cu2$ is recirculated back into curing bins $Cu1$, and then passed through compost vessels Co. However, in an alternative embodiment, it is contemplated to pass ambient air directly into the curing bins $Cu1$, and exhaust biofiltered air directly to ambient from curing bins $Cu2$.

The entire composting process will typically require approximately seventy-five days, and will require only minimal user intervention. The containers may be directly transported from one set of interconnection points with the gas stream into another set. Using the air pressure sensors and dampers illustrated, for example in my published international application referenced herein above, the containers will be simply disconnected, moved, and reconnected, with no other actions being required of the operator. Should one of the bins need further treatment such as remixing outlined in the aforementioned international application, the specific procedure will be carried out as outlined in that same international application. Very little additional training is required by the current invention, and the present composting system requires only source materials for operation. No additional biofiltration media is required, thereby eliminating the burden of additional expense associated with typical biofilters or chemical scrubbing equipment and the economic loss of value owing to the loss of nitrogen content.

The economics of the present system is fully appreciated by the recognition that the present inventive system overcomes many of the losses encountered in the prior art. Not only does the compost form the source material for the biofiltration, and thereby simultaneously biofilter and cure, but the biofilter container is now not a separate capital investment. In the prior art systems, a separate dedicated container was required for the biofilter and for the curing bin. In the present preferred embodiment, the curing bin serves the multiple purposes of curing, biofiltration, and fertilizer enrichment, consequently reducing the amount of capital equipment and lowering the operating costs. Likewise, since the entire system operates from a single ventilation loop, it is possible to operate the system from a single blower. No additional blowers are required for either the biofilter or the curing bins. Furthermore, in some severe prior art applications, it was not only necessary to use a biofilter in conjunction with the composting vessel, but also in association with the curing bins. The present invention enables one biofiltration device to serve the needs of both composting vessels and curing bins.

Similarly to the optimization of capital equipment, the flow of energy has been optimized as well in the preferred system. Compost which is ready for curing bin $Cu1$ will still be slightly exothermic in nature. This energy, which was formerly vented to the atmosphere, will in the present invention be forwarded to the composting vessel Co in the form of preheated air. Similarly, in the prior art the energy released from a typical biofilter is also released directly to ambient, without any effort being made at recovery. In the present preferred recirculating embodiment, this waste energy in the form of a pre-heated gas stream is used as the input into curing bin $Cu1$. Interestingly, the most preferred operating temperature range for biofiltration is also the correct temperature range for curing in curing bin $Cu1$. Consequently, previously wasted heat from biofilters and curing bins is preserved.

Where an open loop system is used, or a continuous mixing of fresh air into the system, a bin may also be provided which has a slight negative pressure into which ambient air may be drawn. This may be accomplished through the use of an air permeable membrane or perforate screen, and with the use of a blower system which ensures the slight negative pressure within the bin. Other gas mixing techniques may also be recognized by those skilled in the art.

While the foregoing details what is felt to be the preferred embodiment of the invention, no material limitations to the scope of the claimed invention are intended. Further, features and design alternatives that would be obvious to one of ordinary skill in the art in light of the present disclosure are considered to be incorporated herein. The number of possible variants is simply too great to attempt to iterate each herein. The scope of the invention is set forth and particularly described in the claims herein below.

I claim:

1. A gas recirculating compost system, comprising:
   a closed aerobic compost vessel with a gas inlet and a gas outlet;
   a closed aerobic curing bin having a gas inlet and a gas outlet operatively connected to send gas to said compost vessel gas inlet; and
   a closed biofilter having a gas inlet operatively connected to receive gas from said compost vessel gas outlet, and a gas outlet operatively connected to send gas to said curing bin gas inlet and
   a gas blower operatively connected to the system and constructed so as to recirculate a gas stream within the system.

2. The gas recirculation compost system of claim 1 wherein said gas blower recirculated the gas stream from the compost vessel through the biofilter to the curing bin and then returned to the compost vessel.

3. The gas recirculation compost system of claim 1 further comprising ports to introduce fresh air into the recirculation system to replenish consumed oxygen, and to vent waste gas from the system.

4. The gas recirculation compost system of claim 1 further comprising an additional biofilter and a monitor for monitoring and control of the gas stream.

5. A method for biologically processing source materials into agriculturally beneficial fertilizer, comprising the steps of:
   recirculating air and waste gases through a compost vessel, a biofilter and a curing bin and back to the compost bin;
   monitoring characteristics and composition of the gases; and controlling the system in accordance with said monitoring.

6. The method of claim 5 further comprising the steps of:

composting said source material to produce composted source material;

transferring said composted source material to said curing bin;

curing said composted source material to produce cured material;

transferring said cured material to said biofilter; and biofiltering said air and waste gases with said cured material.

7. The method of claim 5 further comprising the steps of:

composting said source material in sad compost vessel to produce composted source material;

transferring said compost vessel to a curing bin connection and operatively connecting said compost vessel within said recirculating air and waste gases;

curing said composted source material in said compost vessel to produce cured material;

transferring said compost vessel to a biofilter connection and operatively connecting said compost vessel with said recirculating air and waste gases; and biofiltering said air and waste gases with said cured material.

8. The gas recirculation compost system of claim 4 further comprising means for controlling the nitrogen content within said closed aerobic curing bin.

9. The gas recirculation compost system of claim 4 further comprising means for controlling the pH within said closed aerobic curing bin.

10. The gas recirculation compost system of claim 4 further comprising means for controlling the carbon dioxide content within said closed aerobic curing bin.

* * * * *